United States Patent
Chang et al.

(10) Patent No.: US 10,609,535 B2
(45) Date of Patent: Mar. 31, 2020

(54) BLUE-TOOTH COMMUNICATION SYSTEM AND BROADCASTING METHOD THEREOF

(71) Applicant: ISSC Technologies Corp., Hsinchu (TW)

(72) Inventors: Li-Wei Chang, Hsinchu (TW); Chung-I Lee, Hsinchu County (TW)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 155 days.

(21) Appl. No.: 14/010,516

(22) Filed: Aug. 26, 2013

(65) Prior Publication Data

US 2015/0056916 A1    Feb. 26, 2015

(51) Int. Cl.
| | | |
|---|---|---|
| *H04W 4/80* | (2018.01) | |
| *H04W 8/00* | (2009.01) | |
| *H04L 1/18* | (2006.01) | |
| *H04W 4/06* | (2009.01) | |
| *H04L 1/00* | (2006.01) | |

(52) U.S. Cl.
CPC ............ *H04W 4/80* (2018.02); *H04L 1/1854* (2013.01); *H04W 4/06* (2013.01); *H04W 8/005* (2013.01); *H04L 2001/0092* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,454,171 | B2 | 11/2008 | Palin et al. | 455/41.2 |
| 7,844,222 | B2 | 11/2010 | Grushkevich | 455/41.2 |
| 7,948,991 | B1* | 5/2011 | Hart | H04L 1/1854 370/395.4 |
| 8,531,959 | B2 | 9/2013 | Wang et al. | 370/235 |
| 2003/0003867 | A1 | 1/2003 | Kawamura | 455/41.1 |
| 2004/0082343 | A1* | 4/2004 | Kim et al. | 455/456.1 |
| 2006/0007887 | A1* | 1/2006 | Kwon | H04L 1/1867 370/329 |
| 2007/0223620 | A1* | 9/2007 | Kalhan | H04L 1/1867 375/295 |

(Continued)

FOREIGN PATENT DOCUMENTS

| | | | | |
|---|---|---|---|---|
| CN | 1386390 A | 12/2002 | | G08C 17/02 |
| CN | 101079888 A | 11/2007 | | H04B 5/02 |

(Continued)

OTHER PUBLICATIONS

Haartsen, Jaap C. "The Bluetooth radio system." Personal Communications, IEEE 7.1 (2000): 28-36.*

(Continued)

*Primary Examiner* — Zhitong Chen
(74) *Attorney, Agent, or Firm* — Slayden Grubert Beard PLLC

(57) ABSTRACT

The present invention provides a blue-tooth communication system and broadcasting methods thereof. The broadcasting method includes: firstly, detecting N blue-tooth receivers in a blue-tooth range of a blue-tooth transmitter, wherein N is a positive integer; and broadcasting a data package by the blue-tooth transmitter in a first transmission timing window; then respectively receiving N acknowledgement packages from the blue-tooth receiver by the blue-tooth transmitter in a plurality of reception timing windows.

11 Claims, 7 Drawing Sheets

(56) References Cited

U.S. PATENT DOCUMENTS

| | | | | |
|---|---|---|---|---|
| 2009/0041000 A1* | 2/2009 | Obuchi | ................... | H04L 47/10 |
| | | | | 370/345 |
| 2009/0232041 A1* | 9/2009 | Smith | ................... | H04L 1/1867 |
| | | | | 370/312 |
| 2012/0014329 A1* | 1/2012 | Kwon | ................... | H04L 1/1607 |
| | | | | 370/328 |

FOREIGN PATENT DOCUMENTS

| | | | | |
|---|---|---|---|---|
| CN | 101129025 A | 2/2008 | ............. | H04L 12/28 |
| CN | 101677264 A | 3/2010 | ............... | H04L 1/16 |
| CN | 101729223 A | 6/2010 | ............... | H04L 1/18 |
| CN | 201523458 U | 7/2010 | ................ | H04B 5/02 |
| CN | 102035574 A | 4/2011 | ............... | H04B 5/00 |
| CN | 103167137 A | 6/2013 | ............. | G08B 13/14 |
| JP | 2005086579 A * | 3/2005 | ............... | H04Q 7/20 |

OTHER PUBLICATIONS

Taiwan Rejection Decision, Application No. 102137362, 7 pages, dated Feb. 3, 2016.
Chinese Office Action, Application No. 201310566172.0, 13 pages, dated May 2, 2017.

* cited by examiner

BLUE-TOOTH COMMUNICATION SYSTEM AND BROADCASTING METHOD THEREOF

BACKGROUND OF THE INVENTION

Field of Invention

The present invention generally relates to a blue-tooth communication system, and more particularly to broadcasting method for a blue-tooth for the blue-tooth broadcasting transmitter of the blue-tooth communication system.

Description of Prior Art

Along with the rapid development of science and technology at the present, wireless data communication is more popular in electronic apparatus. The blue-tooth protocol is a well known wireless data transmission protocol, and is widely used in portable electronic apparatus.

Nowadays, a conventional blue-tooth transceiver can transmit broadcast data package in one way. For data package broadcasting, a conventional blue-tooth transmitter can not get any information from the blue-tooth receivers after a data package is broadcasted to the blue-tooth receivers. That is, the blue-tooth transmitter fails to know whether the data package is receives successfully by the blue-tooth receivers or not. The conventional blue-tooth transmitter only can re-broadcast the data package several times, and a number of the re-broadcasting only can be set by an experience of an engineer. The quality of the data package broadcasting is hard to be controlled in the conventional skill art.

SUMMARY OF THE INVENTION

The present invention provides a plurality of broadcasting methods for a blue-tooth transmitter to increase the success rate of the data package broadcasting.

The present invention provides a blue-tooth communication system for increasing the success rate of the data package broadcasting.

The present invention provides one broadcasting method for a blue-tooth communication system. The method includes: firstly, detecting N blue-tooth receivers in a blue-tooth range of a blue-tooth transmitter, wherein N is a positive integer; and broadcasting a data package by the blue-tooth transmitter in a first transmission timing window; then respectively receiving N acknowledgement packages from the blue-tooth receiver by the blue-tooth transmitter in a plurality of reception timing windows.

The present invention provides another broadcasting method for a blue-tooth communication system. The method includes: firstly, detecting N blue-tooth receivers in a blue-tooth range of a blue-tooth transmitter, wherein N is a positive integer; and broadcasting a data package by the blue-tooth transmitter in a first transmission timing window; then respectively receiving N non-acknowledgement packages from the blue-tooth receiver by the blue-tooth transmitter in a plurality of reception timing windows.

The present invention further provides a blue-tooth communication system, includes a blue-tooth transmitter and N blue-tooth receivers. The blue-tooth transmitter, having a blue-tooth range, and the blue-tooth receivers are arranged in the blue-tooth range. The blue-tooth transmitter detects the N blue-tooth receivers, and broadcasts a data package by the blue-tooth transmitter in a first transmission timing window. Moreover, the blue-tooth transmitter respectively receives N acknowledgement packages or N non-acknowledgement packages from the blue-tooth receivers in a plurality of reception timing windows.

Accordingly, the present disclosure provides a blue-tooth transmitter which decides to re-broadcast the data package or not by the acknowledgement packages or non-acknowledgement packages from the blue-tooth receivers. The blue-tooth transmitter may obtain a broadcasting result by the acknowledgement packages or non-acknowledgement packages. That is, the data package may be re-broadcasted by the blue-tooth transmitter till the data package is received by all of the blue-tooth receivers. The success rate of the data package broadcasting can be increased.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
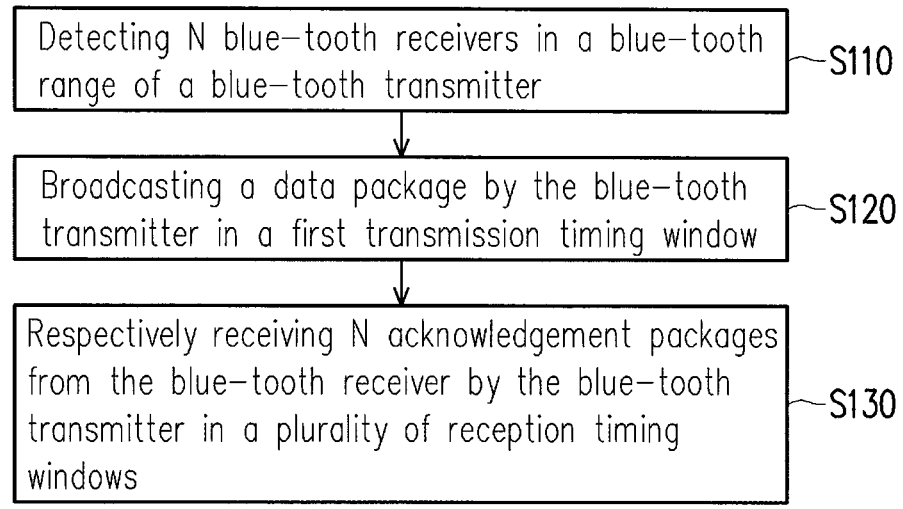
FIG. 1 is a flow chart of a broadcasting method for a blue-tooth communication system.

Reference will now be made in detail to the present preferred embodiment of the invention, examples of which are illustrated in the accompanying drawings. Wherever possible, the same reference numbers are used in the drawings and the description to refer to the same or like parts.

Please referring to FIG. 1, FIG. 1 is a flow chart of a broadcasting method for a blue-tooth communication system. In the step S110, a blue-tooth transmitter of the blue-tooth communication system detects one or more blue-tooth receivers in a blue-tooth range of the blue-tooth transmitter. Then, in step S120, the blue-tooth transmitter broadcasts a data package to the N blue-tooth receivers which are detected in the step S110 in a first transmission timing window, wherein N is a positive integer. Correspondingly, in the step S130, the N blue-tooth receivers respectively send back N acknowledgement packages to the blue-tooth transmitter when the data package is received successfully by the N blue-tooth receivers.

Please notice here, any one of the N blue-tooth receivers does not send back the acknowledgement package to the blue-tooth transmitter when the blue-tooth receiver fails to receive the acknowledgement package. In the embodiment, the blue-tooth transmitter detects whether all of the N acknowledgement packages from all of the N blue-tooth receivers are received or not to generate a broadcasting result. Moreover, the blue-tooth transmitter may judge the broadcasting operation for the data package is successful or not according to the broadcasting result. If the broadcasting operation for the data package is not successful, the blue-tooth transmitter may re-broadcast the data package to the N blue-tooth receivers.

Figure 2:
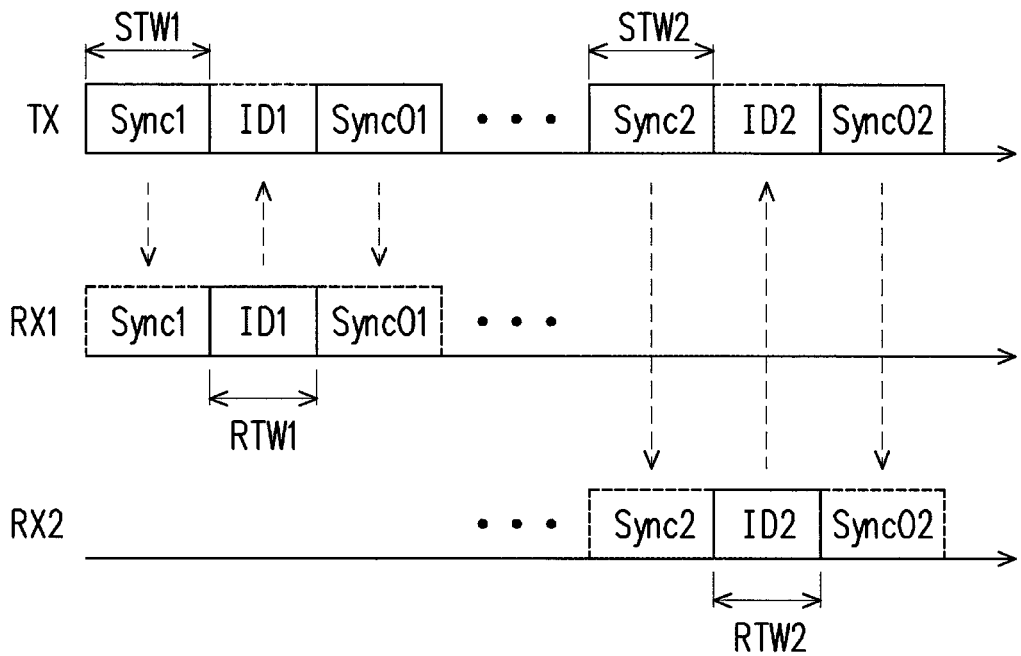
FIG. 2 is a timing chart of the broadcasting method according to the embodiment of the present invention.

Please referring to FIG. 2, FIG. 2 is a timing chart of the broadcasting method according to the embodiment of the present invention. In FIG. 2, when the blue-tooth transmitter TX detects the blue-tooth receivers in the blue-tooth range of the blue-tooth transmitter TX, the blue-tooth transmitter TX may send a plurality of synchronization signals Sync1~Sync2 during a plurality of synchronization timing windows STW1~STW2, respectively. The blue-tooth receiver RX1 in the blue-tooth range receives the synchronization signal Sync1, and may send back an identification data package ID1 to the blue-tooth transmitter TX during a response timing window RTW1. Moreover, the blue-tooth receiver RX2 in the blue-tooth range receives the synchronization signal Sync2, and may send back an identification data package ID2 to the blue-tooth transmitter TX during a response timing window RTW2. Accordingly, the blue-tooth transmitter TX may decide there are two blue-tooth receivers RX1 and RX2 in the blue-tooth range, and the blue-tooth transmitter TX can broadcast a data package to the blue-tooth receivers RX1 and RX2.

Please notice here, the identification data packages ID1 and ID2 may be the BD address of the blue-tooth receivers RX1 and RX2, respectively. Besides, the identification data packages ID1 and ID2 may also provided to the blue-tooth transmitter TX to be decision references for the broadcasting operation.

Besides, the response timing windows RTW1 and RTW2 are respectively generated after the synchronization timing windows STW1 and STW2.

On the other hand, the blue-tooth transmitter TX may further respectively send an extra synchronization signals SyncO1 and SyncO2 after the response timing windows RTW1 and RTW2. The extra synchronization signals SyncO1 and SyncO2 are used to selectively decide the data content for transporting and used to decide to transport extra data or not according to a strategic decision of the blue-tooth transmitter TX.

Figure 3A:
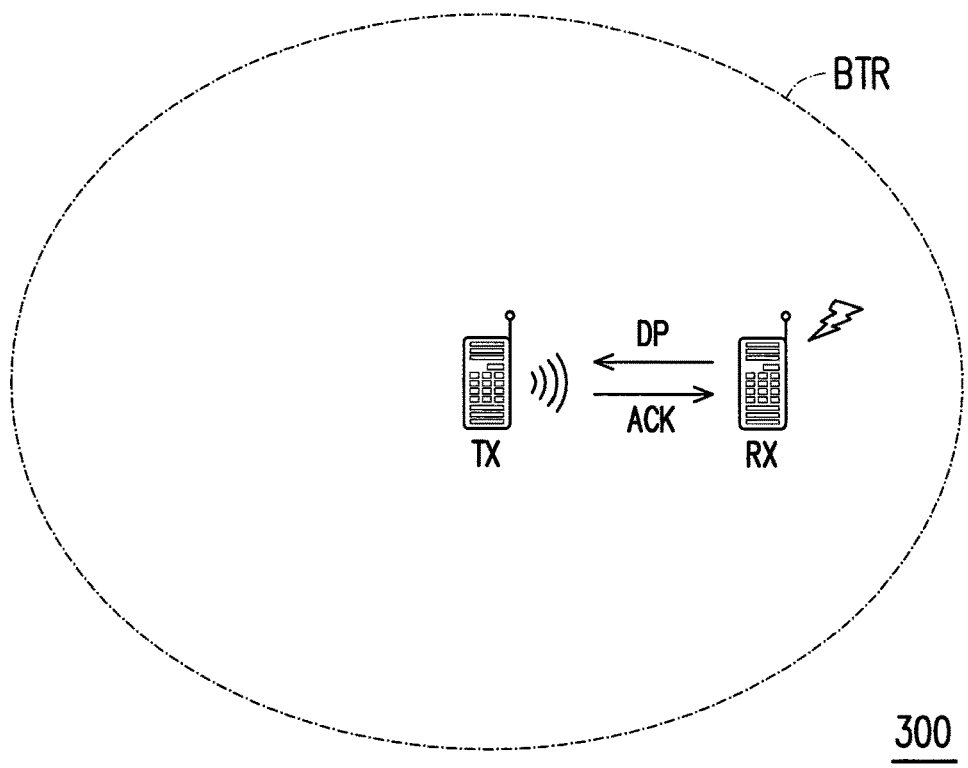
FIG. 3A is a diagram of a blue-tooth communication system according to an embodiment of the present invention.

Please referring to FIG. 3A, FIG. 3A is a diagram of a blue-tooth communication system according to an embodiment of the present invention. The blue-tooth communication system 300 includes a blue-tooth transmitter TX, and the blue-tooth transmitter TX has a blue-tooth range BTR. The blue-tooth transmitter TX detects only one blue-tooth receiver RX arranged in the blue-tooth range BTR, and the blue-tooth transmitter TX may broadcast a data package DP to the blue-tooth receiver RX.

Figure 3B:
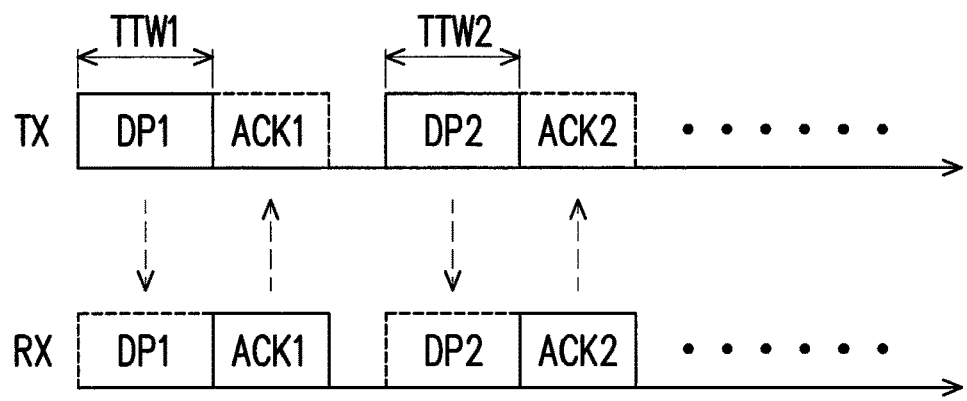
FIG. 3B is a timing chart of the broadcasting method according to the embodiment of the present invention.

In the embodiment, the blue-tooth receiver RX may return an acknowledgement package ACK to the blue-tooth transmitter TX when the blue-tooth receiver RX has receives the data package DP successfully. Please referring to FIG. 3A and FIG. 3B, FIG. 3B is a timing chart of the broadcasting method according to the embodiment of the present invention. In FIG. 3B, the blue-tooth transmitter TX broadcasts the data package DP1 during a transmission timing window TTW1. The blue-tooth receiver RX receives the data package DP1 and sends back an acknowledgement package ACK1 to the blue-tooth transmitter TX. Furthermore, the blue-tooth transmitter TX broadcasts the data package DP2 during another transmission timing window TTW2. The blue-tooth receiver RX receives the data package DP2 and sends back an acknowledgement package ACK2 to the blue-tooth transmitter TX.

According to the acknowledgement packages ACK1 and ACK2 received by the blue-tooth transmitter TX, the blue-tooth transmitter TX can realize the data packages DP1 and DP2 are all transmitted to the blue-tooth receiver RX successfully (the broadcast result is "success"). On the contrary, if the blue-tooth transmitter TX fails to receive at least one of the acknowledgement packages ACK1 and ACK2 from the blue-tooth receiver RX, the blue-tooth transmitter TX can realize the broadcast operation of the data packages DP1 and DP2 is failed (the broadcast result is "fail"), and the blue-tooth transmitter TX may re-broadcast the data packages DP1 and/or DP2.

Figure 4A:
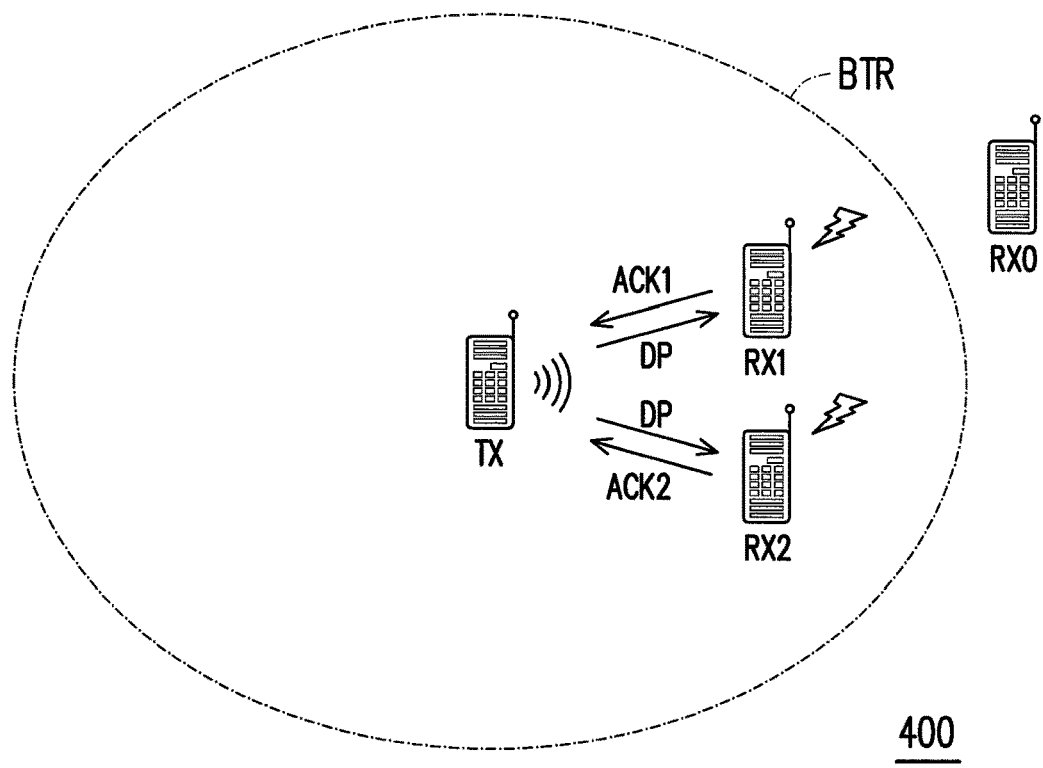
FIG. 4A is the other diagram of a blue-tooth communication system according to an embodiment of the present invention.

Please referring to FIG. 4A, FIG. 4A is the other diagram of a blue-tooth communication system according to an embodiment of the present invention. The blue-tooth communication system 400 includes a blue-tooth transmitter TX, and the blue-tooth transmitter TX has a blue-tooth range BTR. The blue-tooth transmitter TX detects there are two blue-tooth receivers RX1 and RX2 in the blue-tooth range BTR, and the blue-tooth transmitter TX broadcasts data packages DP1 and DP2 in sequence to the blue-tooth receivers RX1 and RX2. The blue-tooth receivers RX1 and RX2 may respectively return acknowledgement packages ACK1 and ACK2 to the blue-tooth transmitter TX when the data packages DP1 and DP2 are received by the blue-tooth receivers RX1 and RX2. On the contrary, the blue-tooth receivers RX1 and RX2 fails to return acknowledgement packages ACK1 and/or ACK2 to the blue-tooth transmitter TX when one or both of the data packages DP1 and DP2 are not received by the blue-tooth receivers RX1 and RX2.

Figure 4B:
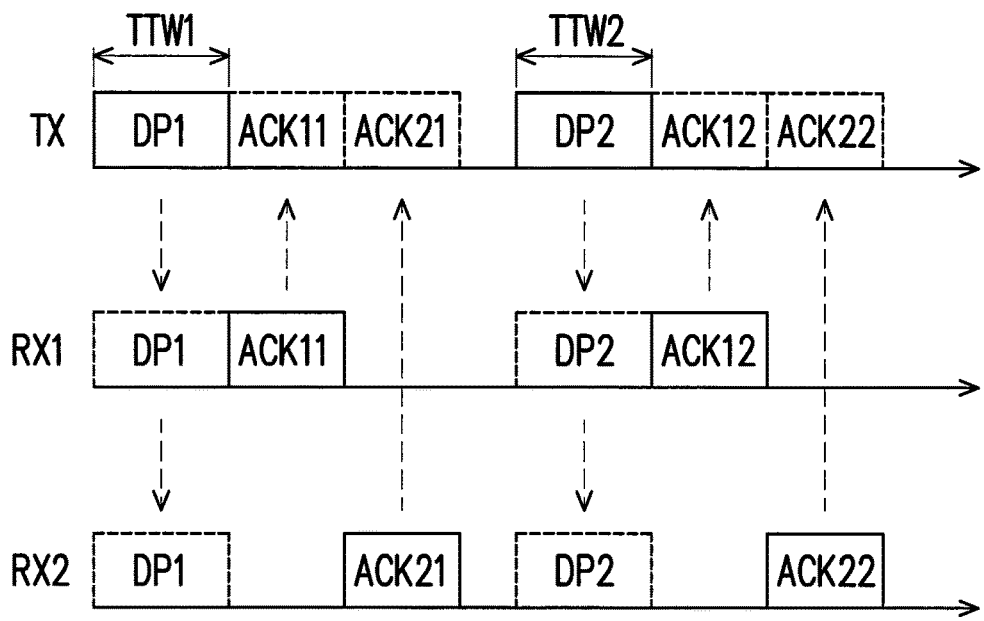
FIG. 4B is a timing chart of the blue-tooth communication system according to the embodiment of the present invention.

Please referring to FIG. 4A and FIG. 4B, wherein FIG. 4B is a timing chart of the blue-tooth communication system 400 according to the embodiment of the present invention. In FIG. 4B, the blue-tooth transmitter TX executes a broadcast operation, and a data package DP1 is transmitted to the blue-tooth receivers RX1 and RX2 during the transmission timing window DP1. If the blue-tooth receiver RX1 receives the data package DP1, the blue-tooth receiver RX1 may return an acknowledgement package ACK11 to the blue-tooth transmitter TX. If the blue-tooth receiver RX1 fails to receive the data package DP1, the blue-tooth receiver RX1 may not return an acknowledgement package ACK11 to the blue-tooth transmitter TX. On the other hand, if the blue-tooth receiver RX1 receives the data package DP1, the blue-tooth receiver RX2 may return an acknowledgement package ACK21 to the blue-tooth transmitter TX, and if the blue-tooth receiver RX2 fails to receive the data package DP1, the blue-tooth receiver RX2 may not return an acknowledgement package ACK21 to the blue-tooth transmitter TX.

More especially, a timing window of the acknowledgement package ACK21 transmitted to the blue-tooth transmitter TX is after a timing window of the acknowledgement package ACK11 transmitted to the blue-tooth transmitter TX. That is, the timing windows for the blue-tooth receivers RX1 and RX2 to return the e acknowledgement packages ACK11 and ACK22 are arranged in a row, and any two of the timing windows are not overlapped.

If at least one of the acknowledgement packages ACK11 and ACK21 is not received by the blue-tooth transmitter TX, the blue-tooth transmitter TX can decide the broadcast result is "fail". The blue-tooth transmitter TX may re-broadcast the data package DP1 in transmission timing window TTW2. In this case, the data packages DP1 and DP2 are the same. Correspondingly, the blue-tooth receivers RX1 and RX2 may respectively return the acknowledgement packages ACK12 and ACK22 if the data package DP2 is received successfully by the blue-tooth receivers RX1 and RX2.

If the data package DP1 transmitted during the transmission timing window TTW1 is received by the blue-tooth receivers RX1 and RX2 successfully, the blue-tooth transmitter TX may broadcast the data package DP2 which is different from the data package DP during the transmission timing window TTW2. The blue-tooth transmitter TX may decide to broadcast another new data package during a next transmission timing window or re-broadcast the data package DP2 during the next transmission timing window according to the acknowledgement packages ACK12 and ACK22.

Please referring to FIG. 4A again, in FIG. 4A, there is a blue-tooth receiver RXO. The blue-tooth receiver RXO is out of the blue-tooth range BTR, and the blue-tooth receiver RXO can not obtain the synchronization signal from the blue-tooth transmitter TX. That is, the blue-tooth transmitter TX fails to detect the blue-tooth receiver RXO, and fails to broadcast any data package to the blue-tooth receiver RXO.

Figure 4C:
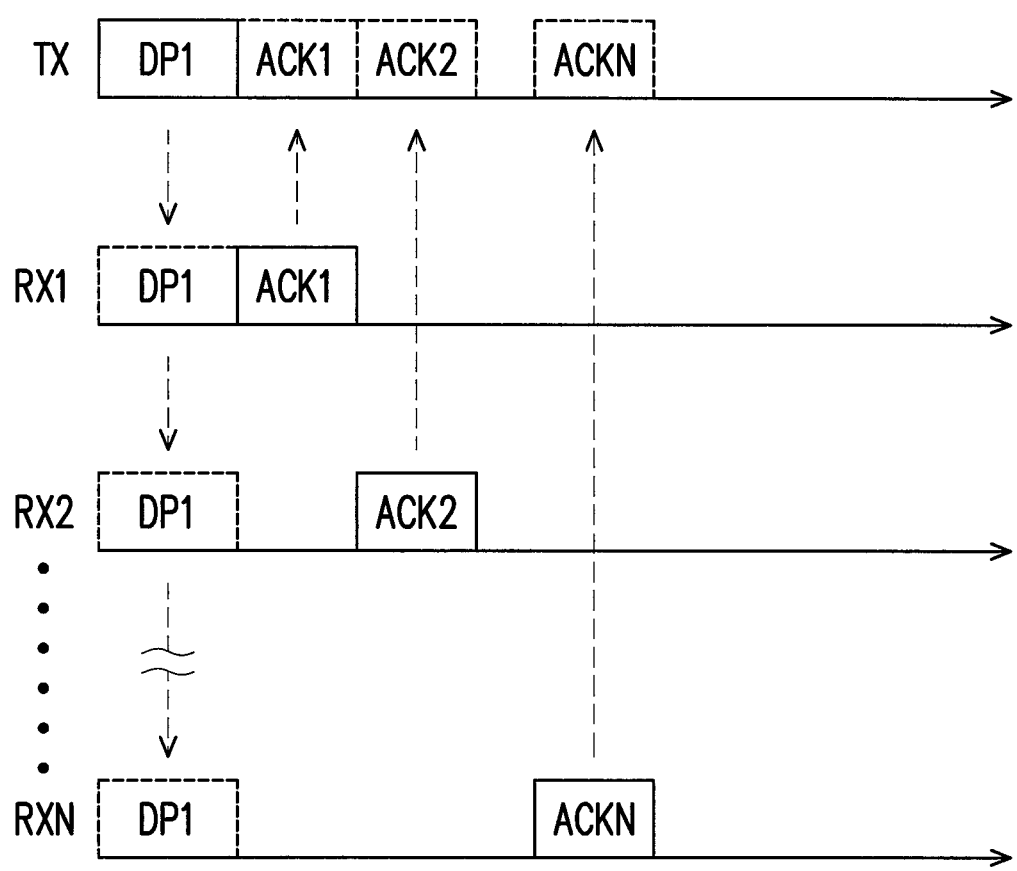
FIG. 4C is another timing chart of the broadcasting method according to the embodiment of the present invention.

Please referring to FIG. 4C, FIG. 4C is another timing chart of the broadcasting method according to the embodiment of the present invention. The blue-tooth transmitter TX may broadcast data package to N blue-tooth receivers RX1~RXN, wherein N is larger than 2. When the blue-tooth receivers RX1~RXN receives the data package DP1 from the blue-tooth transmitter TX, the blue-tooth receivers RX1~RXN may respectively return N acknowledgement packages ACK1~ACKN. The timing windows for respectively transmitting the N acknowledgement packages ACK1~ACKN are arranged in a row, and any two of the timing windows are not overlapped.

Figure 5:
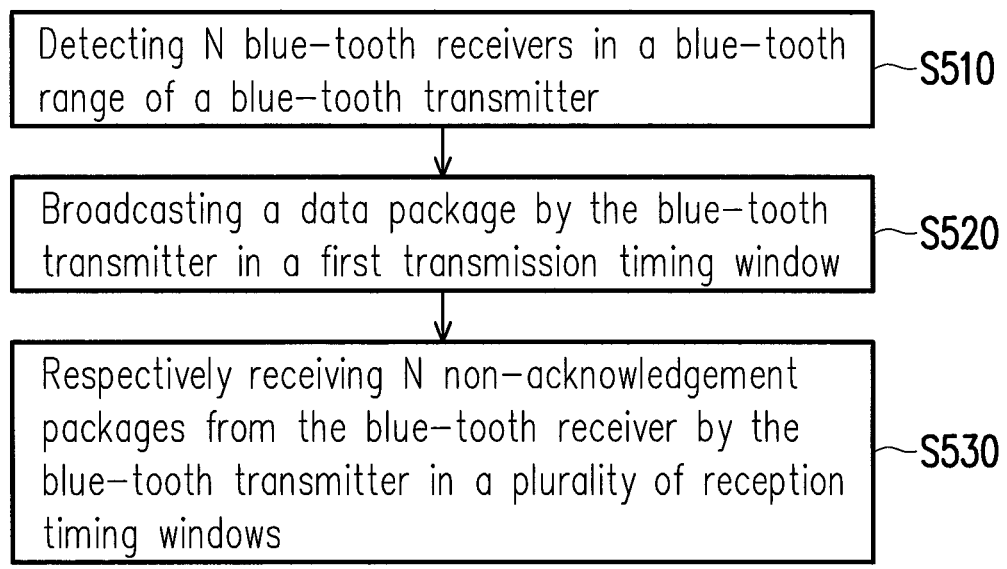
FIG. 5 is another flow chart of a broadcasting method for a blue-tooth communication system.

Please referring to FIG. 5, FIG. 5 is another flow chart of a broadcasting method for a blue-tooth communication system. In the step S510, a blue-tooth transmitter of the blue-tooth communication system detects one or more blue-tooth receivers in a blue-tooth range of the blue-tooth transmitter. Then, in step S520, the blue-tooth transmitter broadcasts a data package to the N blue-tooth receivers which are detected in the step S510 in a first transmission timing window, wherein N is a positive integer. Correspondingly, in the step S530, the N blue-tooth receivers respectively send back N non-acknowledgement packages to the blue-tooth transmitter when the data package is not received successfully by the N blue-tooth receivers.

Please notice here, any one of the N blue-tooth receivers send back the non-acknowledgement package to the blue-tooth transmitter when the blue-tooth receiver fails to receive the acknowledgement package. In the embodiment, the blue-tooth transmitter detects whether at least one of the N non-acknowledgement packages from the N blue-tooth receivers are received or not to generate a broadcasting result. Moreover, the blue-tooth transmitter may judge the broadcasting operation for the data package is successful or not according to the broadcasting result. If the broadcasting operation for the data package is not successful, the blue-tooth transmitter may re-broadcast the data package to the N blue-tooth receivers.

In detail, if one or more non-acknowledgement packages are received by the blue-tooth transmitter, that is, at least one of the N blue-tooth receivers fails to receive the data package. Accordingly, the blue-tooth transmitter may decide the broadcast result is fail, and re-broadcast the data package to the blue-tooth receivers.

Figure 6A:
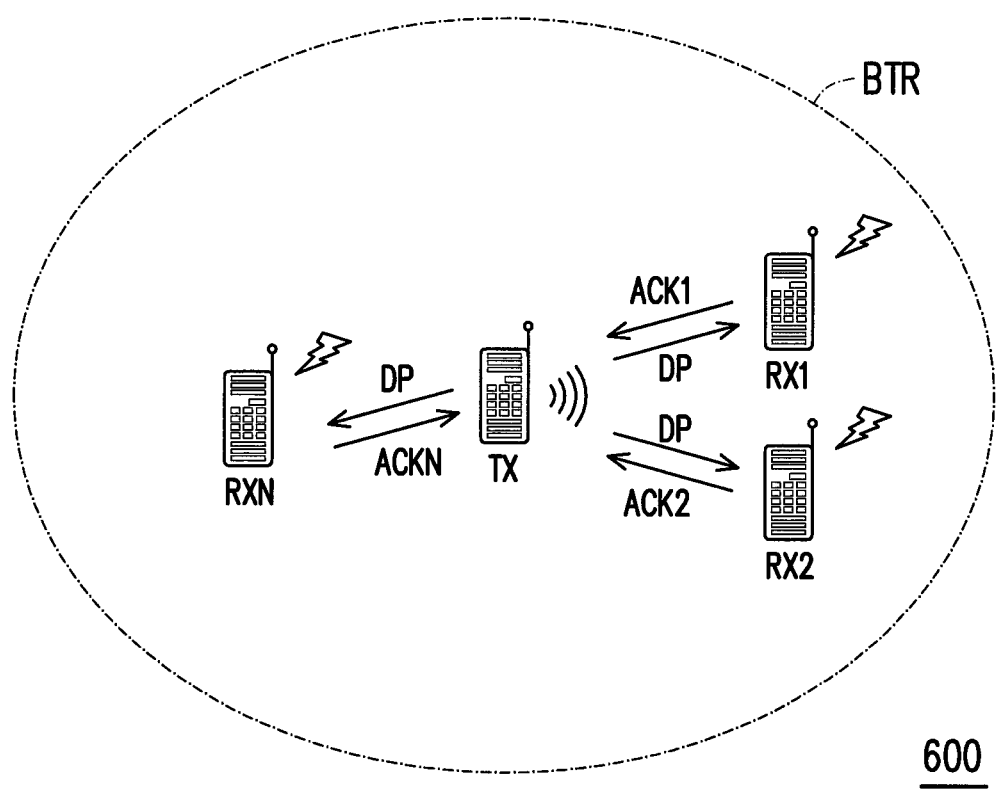
FIG. 6A is another diagram of a blue-tooth communication system according to an embodiment of the present invention.

Please referring to FIG. 6A, FIG. 6A is another diagram of a blue-tooth communication system according to an embodiment of the present invention. The blue-tooth communication system 600 includes a blue-tooth transmitter TX, and the blue-tooth transmitter TX has a blue-tooth range BTR.

The blue-tooth transmitter TX detects there are a plurality of blue-tooth receivers RX1~RXN in the blue-tooth range BTR. The blue-tooth transmitter TX may broadcast a data package DP to the blue-tooth receivers RX1~RXN, and each of the blue-tooth receivers RX1~RXN may return non-acknowledgement package NACK1~NACKN to the blue-tooth transmitter TX if the data package DP is not received by each of the blue-tooth receivers RX1~RXN.

Figure 6B:
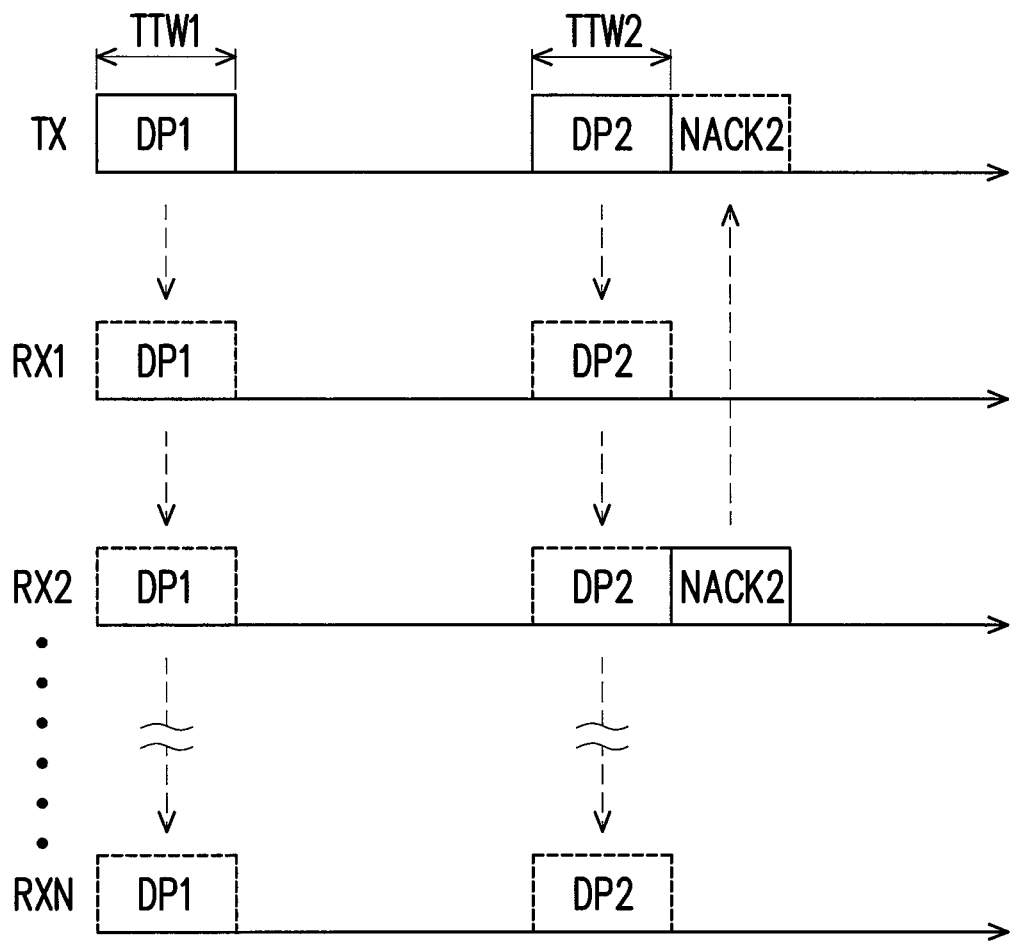
FIG. 6B is a timing chart of the blue-tooth communication system according to the embodiment of the present invention.

Please referring to FIG. 6B, FIG. 6B is a timing chart of the blue-tooth communication system 600 according to the embodiment of the present invention. In FIG. 6B, the blue-tooth transmitter TX broadcasts data package DP1 during the transmission timing window TTW1. Since all of the blue-tooth receivers RX1~RXN receives the data package DP1 successfully, none of the blue-tooth receivers RX1~RXN return non-acknowledgement package to the blue-tooth transmitter TX. The blue-tooth transmitter TX further broadcasts data package DP2 during the transmission timing window TTW2. Since the blue-tooth receiver RX2 fails to receive the data package DP2, the blue-tooth receiver RX2 returns a non-acknowledgement package NACK2 to the blue-tooth transmitter TX.

The blue-tooth transmitter TX may decide the broadcast operation is successful or not by the non-acknowledgement package from the blue-tooth receivers RX1~RXN. If at least one non-acknowledgement package is received by the blue-tooth transmitter TX, the blue-tooth transmitter TX may decide the broadcast result is "fail". On the contrary, if no non-acknowledgement package is received by the blue-tooth transmitter TX, the blue-tooth transmitter TX may decide the broadcast result is "success". Such as that, the blue-tooth transmitter TX can decide to re-broadcast the data package according to the broadcast result to confirm the data package is transmitted to the blue-tooth receivers RX1~RXN.

In summary, the present disclosure provides a blue-tooth transmitter detect the blue-tooth receivers in the blue-tooth range for broadcasting operation. The blue-tooth transmitter determines the broadcasting operation is fail or success according to the acknowledgement package or non-acknowledgement package from the blue-tooth receivers. Such as that, the blue-tooth transmitter can re-broadcast the data package if needed. It can be confirmed that the data package be transported to the blue-tooth receivers, and the performance for the blue-tooth communication can be promoted.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A broadcasting method for a BLUETOOTH communication system, comprising:
    detecting N BLUETOOTH receivers in a BLUETOOTH range of a BLUETOOTH transmitter, wherein N is a positive integer;
    during a synchronization phase, broadcasting a synchronization packet by the BLUETOOTH transmitter to the N BLUETOOTH receivers;
    during a data transmission phase, broadcasting, according to the synchronization packet, a data package by the BLUETOOTH transmitter in a first transmission timing window; and
    during the data transmission phase, determining whether each BLUETOOTH receiver replied with an acknowledgment package in a respective one of a plurality of reception timing windows;
    wherein:
        each of the N BLUETOOTH receivers responds to successful reception of the data package by sending an acknowledgment package;
        each of the N BLUETOOTH receivers does not respond upon failure to receive data in the data package after successful receipt of the synchronization packet, the synchronization packet causing the BLUETOOTH receiver to expect the data package from the BLUETOOTH transmitter; and
        the N BLUETOOTH transmitter does not expect a non-acknowledgement package in response to failure of any of the N BLUETOOTH receivers to receive the data package.

2. The broadcasting method for the BLUETOOTH communication system according to claim 1, wherein the step of detecting N BLUETOOTH receivers in the BLUETOOTH range of the BLUETOOTH transmitter comprises:
    transmitting a plurality of synchronization signals by the BLUETOOTH transmitter during a plurality of synchronization timing windows; and
    receiving a plurality of identification data packages during a plurality of response timing windows respectively to detect the N BLUETOOTH receiver.

3. The broadcasting method for the BLUETOOTH communication system according to claim 2, wherein the synchronization timing windows are respectively generated before the response timing windows.

4. The broadcasting method for the BLUETOOTH communication system according to claim 1, wherein the non-acknowledgment package indicate that the data package was not received at the respective receiver.

5. The broadcasting method for the BLUETOOTH communication system according to claim 1, further comprising:
    generating a broadcasting result based on whether acknowledgement packages from the BLUETOOTH receivers are detected at the BLUETOOTH transmitter; and
    deciding to re-broadcast the data package by the BLUETOOTH transmitter in a second transmission timing window according to the broadcasting result.

6. The broadcasting method for the BLUETOOTH communication system according to claim 5, wherein the step of deciding to re-broadcast the data package by the BLUETOOTH transmitter in the second transmission timing window according to the broadcasting result comprises:
    re-broadcasting the data package if the broadcasting result indicates that an acknowledgement package was not received from at least one of the N BLUETOOTH receivers by the BLUETOOTH transmitter.

7. A BLUETOOTH communication system, comprising:
    a BLUETOOTH transmitter, having a BLUETOOTH range; and
    N BLUETOOTH receivers being arranged in the BLUETOOTH range;
    wherein the BLUETOOTH transmitter is configured to:
        detect the N BLUETOOTH receivers;
        during a synchronization phase, broadcast a synchronization packet to the N BLUETOOTH receivers;
        during a data transmission phase, broadcast, according to the synchronization packet, a data package in a first transmission timing window; and
        during the data transmission phase, determine whether each BLUETOOTH receiver replied with an acknowledgment package in a respective one of a plurality of reception timing windows;
    wherein:
        each of the N BLUETOOTH receivers is configured to respond to successful reception of the data package by sending an acknowledgment package;
        each of the N BLUETOOTH receivers is configured to not respond to a failure to receive data in the data package after successful receipt of the synchronization packet, the synchronization packet configured to cause the BLUETOOTH receiver to expect the data package from the BLUETOOTH transmitter; and
        the N BLUETOOTH transmitter is configured to expect a non-acknowledgement package in response to failure of any of the N BLUETOOTH receivers to receive the data package.

8. The BLUETOOTH communication system according to claim 7, wherein the BLUETOOTH transmitter is configured to:
    detect whether any non-acknowledgement packages are received from the N BLUETOOTH receivers to generate a broadcasting result; and
    re-broadcast the data package according to the broadcasting result.

9. The BLUETOOTH communication system according to claim 8, wherein the BLUETOOTH transmitter is configured to, if at least one non-acknowledgment package is received by the BLUETOOTH transmitter, re-broadcast the data package according to the broadcasting result.

10. The BLUETOOTH communication system according to claim 7, wherein the BLUETOOTH transmitter is configured to:
    generate a broadcasting result based on whether all acknowledgement packages are received from the N BLUETOOTH receivers; and
    re-broadcast the data package according to the broadcasting result.

11. The BLUETOOTH communication system according to claim 10, wherein the BLUETOOTH transmitter is configured to re-broadcast the data package if the broadcasting result indicates that an acknowledgement package was not received from at least one of the N BLUETOOTH receivers by the BLUETOOTH transmitter.

* * * * *